United States Patent [19]
Piguet

[11] 3,995,827
[45] Dec. 7, 1976

[54] VALVE OPERABLE SOLELY UNDER STILL WATER CONDITIONS, CHIEFLY IN FORCED FLOW CHANNELS

[75] Inventor: Pierre Piguet, Onex, Switzerland
[73] Assignee: Ateliers des Charmilles S.A., Geneva, Switzerland
[22] Filed: Sept. 3, 1974
[21] Appl. No.: 503,170
[30] Foreign Application Priority Data
  Sept. 4, 1973  Switzerland ............... 12661/73
[52] U.S. Cl. ............................... 251/58; 251/160; 251/175; 251/192
[51] Int. Cl.² ........................................ F16K 5/20
[58] Field of Search ............ 251/58, 160, 161, 175, 251/188, 192

[56] References Cited
UNITED STATES PATENTS 2,034,216  3/1936  Stout et al. .................. 251/161
3,158,172  11/1964  Giovannetti .................. 251/161 X
3,400,907  9/1968  Horn et al. .................. 251/161 X

*Primary Examiner*—Robert G. Nilson
*Attorney, Agent, or Firm*—Emory L. Groff, Jr.

[57] ABSTRACT

A valve shutter is fitted in a channel and is adapted to be shifted, between a valve-opening position and an intermediate position facing a seat provided in the valve body, through rotation around a transverse axis, while the channel is set under still water conditions. The actual fluidtight application of the valve shutter against its seat is ensured by the pressure of the upstream water when normal flow conditions are restored. This dual movement is possible due to the fact that the shutter supports or bearings are resiliently or pneumatically held in position with reference to the valve body.

4 Claims, 9 Drawing Figures

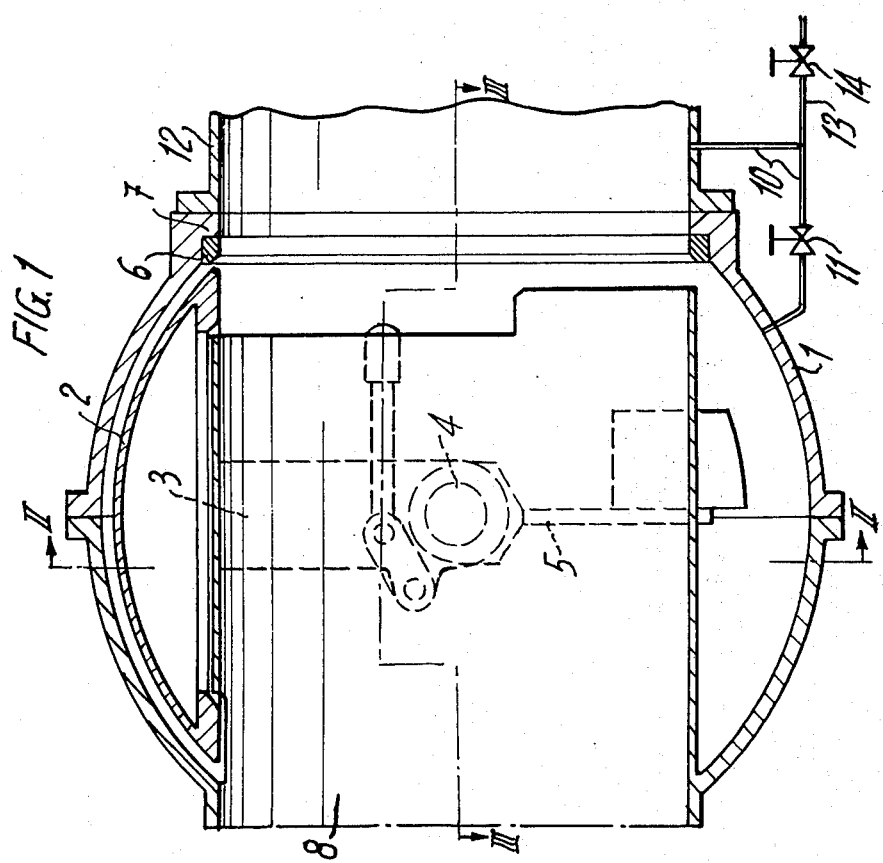
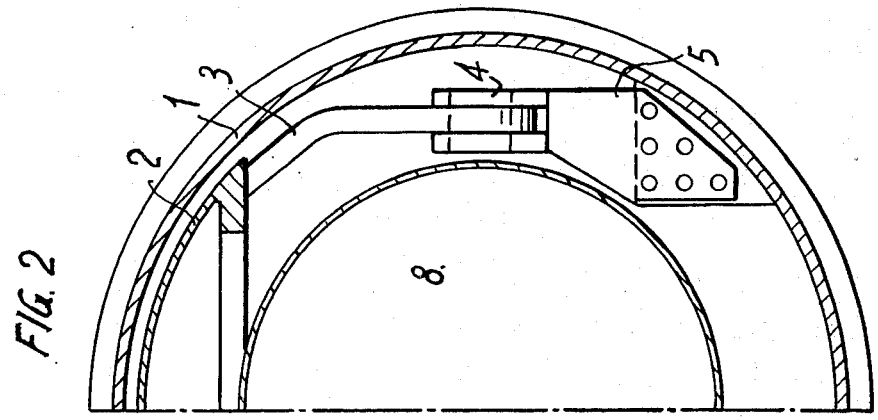
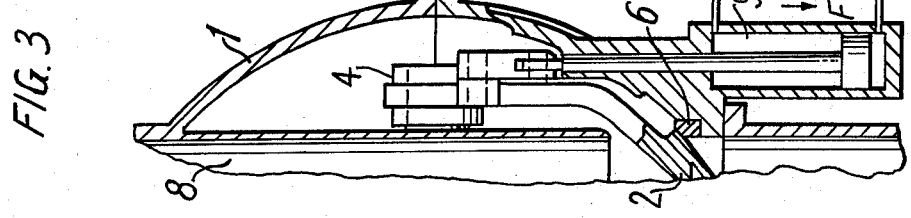

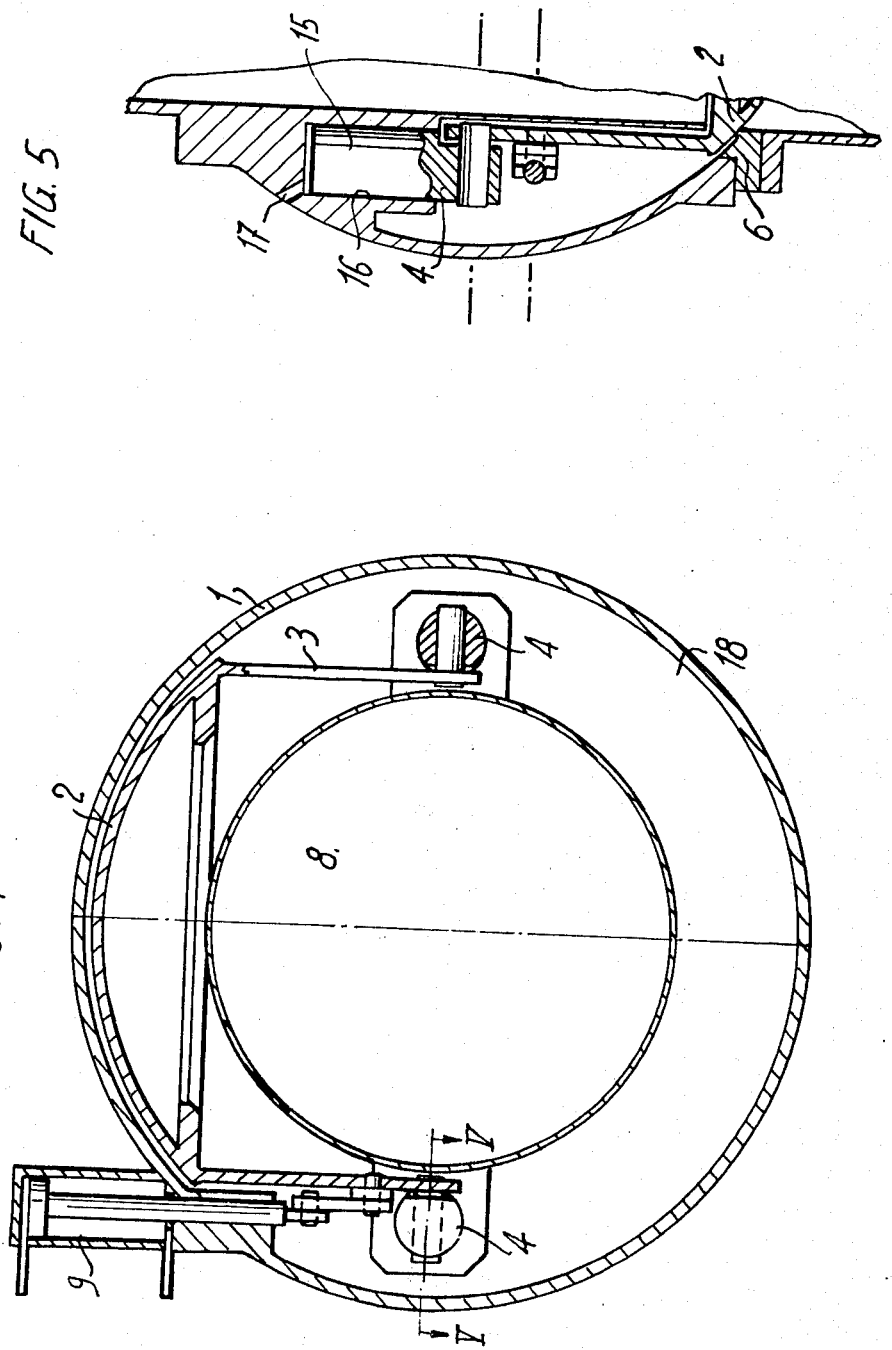

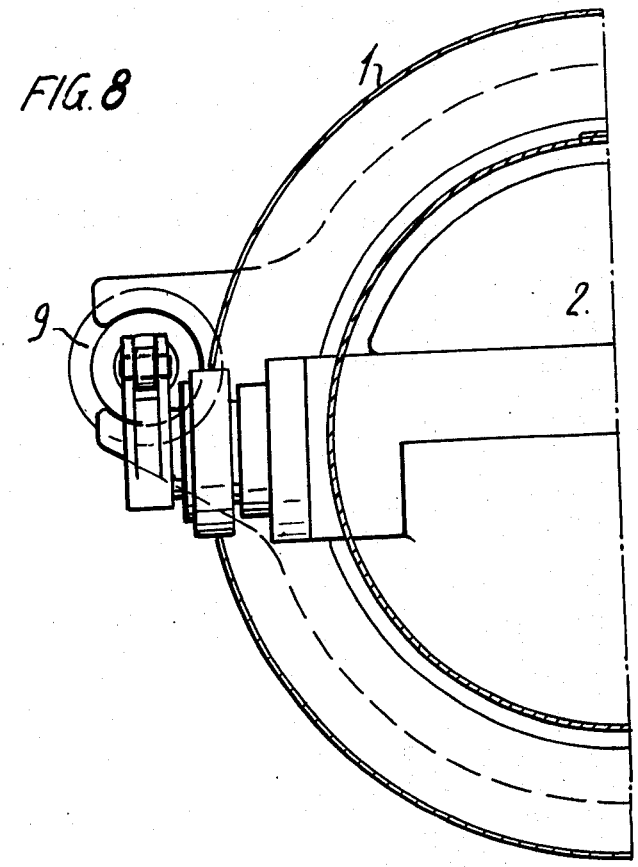
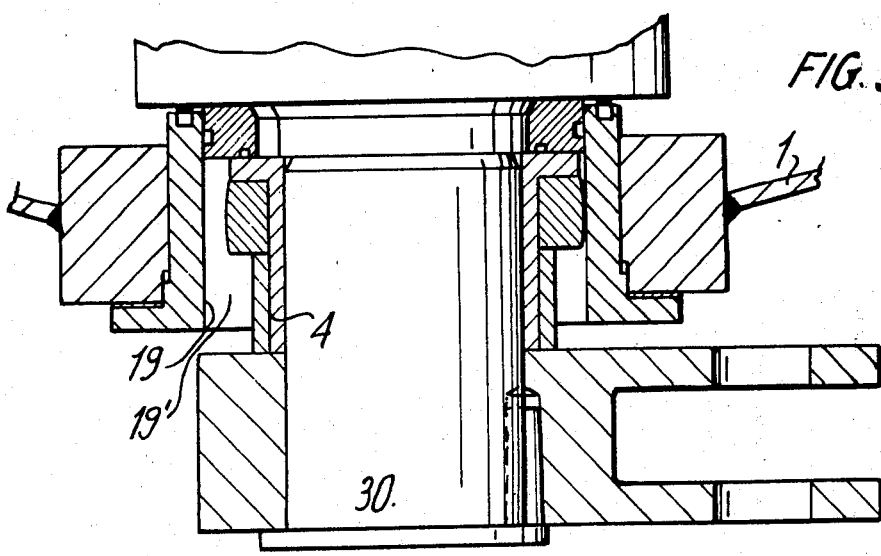

VALVE OPERABLE SOLELY UNDER STILL WATER CONDITIONS, CHIEFLY IN FORCED FLOW CHANNELS

The present invention has for its object a valve operable solely under still water conditions, chiefly for forced-flow mains, said valve being of the type comprising a valve shutter carried by two arms pivotally secured to supporting members, while a seat formed on the body of the valve is engaged by said valve shutter in its valve closing position.

In the known valves of this type, the seat which is separate from the valve body may generally be shifted through auxiliary means towards the valve-shutter in order to ensure fluid-tightness in the closing of the mains by said valve shutter when the latter is in its valve-closing position.

In such prior valves, it is therefore necessary to urge the seat fast against the valve shutter after the latter has been brought into its valve-closing position, and to release it subsequently before returning the valveshutter into its valve-opening position.

In order to eliminate such auxiliary operations, the valve according to the present invention is designed in a manner such that the supporting member, to which the arms carrying the valve shutter are shiftably fitted in the valve body, may be urged towards the seat with the valve shutter by a hydraulic thrust originating in the upstream section of the valve and to place the valve shutter on its seat when said shutter has been brought near its valve-closing position, said thrust being then balanced when the closure is complete by a reaction distributed throughout the periphery of the seat.

The accompanying drawings illustrate diagrammatically and by way of example three embodiments of a valve designed in accordance with the invention. In said drawings:

FIG. 1 is an axial sectional view of the first embodiment, the valve shutter being shown in its open position.

FIG. 2 is a partial transverse cross-section through line II—II of FIG. 1, the valve shutter being open.

FIG. 3 is a partial longitudinal cross-section through line III—III of FIG. 1.

FIG. 4 is a transverse sectional view of the second embodiment, the valve shutter being shown in its open position.

FIG. 5 is a partial longitudinal cross-section through line V—V of FIG. 4, the valve shutter being shown in its closed position.

FIG. 8 is a partial transverse sectional view through line VIII—VIII of FIG. 6, the valve shutter being in its open position.

FIG. 9 is a large-scale partial longitudinal view through line IX—IX of FIG. 6, the valve shutter being shown during its opening stage.

Figure 6:
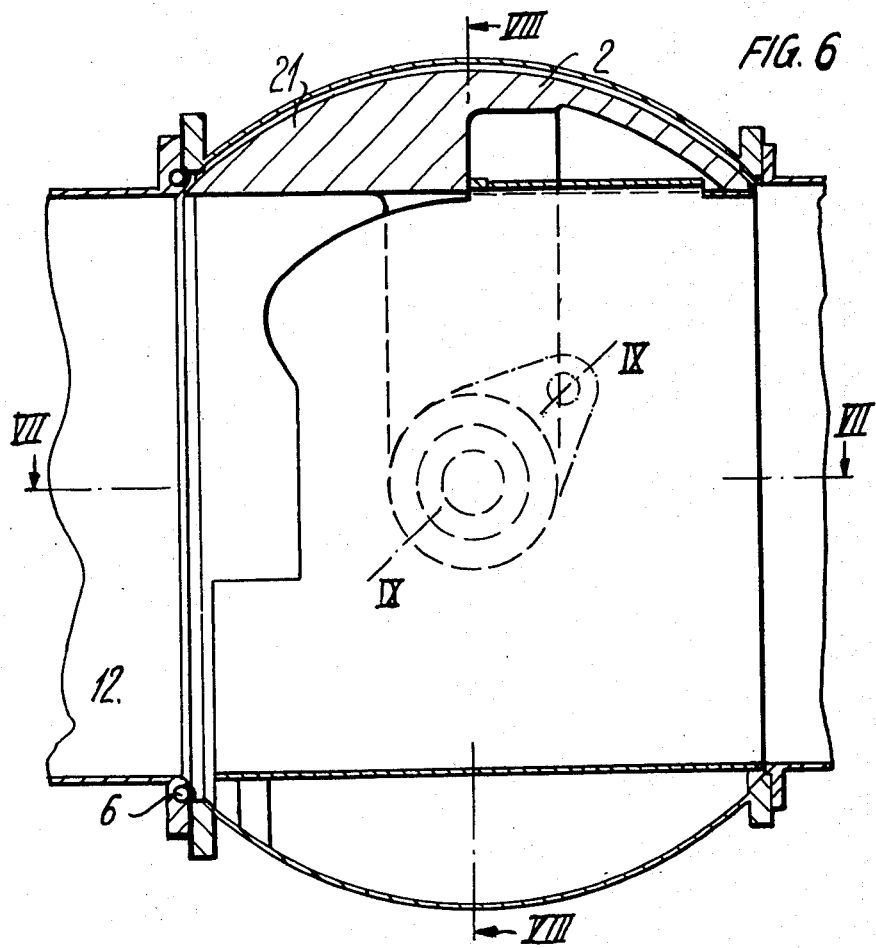
FIG. 6 is an axial sectional view of the third embodiment, the valve shutter being in its open position.

The valve illustrated in FIGS. 1 to 3 of the accompanying drawings includes a body 1 inside which a valve shutter 2 is carried by the inner ends of two arms 3 the outer ends of which are pivotally secured each in one of the two bearings 4 located in registry with each other at diametrically opposite points across the valve. Said bearings are each secured to a support 5 which is adapted to yield resiliently in a direction toward the seat 6 fitted in the valve body at the downstream end 7 of the channel 8 forming the mains. Said supports 5 are carried by the valve body 1 on either side of the channel 8.

A hydraulic jack 9 (FIG. 3) controls the pivotal movement of the valve shutter 2 between an open position as shown in FIGS. 1 and 2 and an intermediate position in which it faces the seat 6. In order to move the valve shutter to this position, it is necessary for the water to be still throughout the forced flow mains, which condition can be satisfied, for instance, by closing the distributor feeding a turbine on the downstream side of the valve.

In order to balance the pressure between the upstream and downstream sections of the valve, the latter is provided with a pipe 10 controlled by a cock 11 which is adapted to connect the section of the valve body lying upstream with reference to the valve shutter 2 in its closed position with the downstream section 12 of the channel. The pipe 10 connects with a branch pipe 13 at a point beyond the cock 11, said branch pipe 13 being controlled by a closing cock 14.

The operation of the valve is as follows:

When it is desired to bring the valve shutter 2 into its valve closing position, the entire forced-flow system is set under still water conditions as provided for instance by closing the distributor of the turbine fed by it. The channel sections ahead of and beyond the valve being thus subjected to the same pressure, the hydraulic jack 9 is actuated in the direction of the arrow F (FIG. 3) so as to make the valve shutter pivot out of its open position (FIGS. 1 and 2) into a position registering with the seat 6. The pressure is then lowered in the down-stream section 12 of the channel, which is obtained by opening the cock 14, the cock 11 on the upstream part of the pipe 10 remaining closed. The valve shutter is then urged against its seat 6 by reason of the difference in pressure between the upstream and downstream sections of the channel produced by the just-mentioned opening of the cock 14 in the branch pipe 13 tapped off the pipe 10.

When it is desired to return the valve shutter into its valve-opening position, it is necessary to close the distributor of the turbine and to provide equilibrium in pressure between the upstream and downstream sections of the channel by opening the cock 11 in the pipe 10, since the cock 14 in the branch pipe 13 is closed. As soon as the pressures are balanced, the valve shutter 2 is no longer urged against the seat 6 from which it is held apart by the resiliency of the supports 5. It can now be returned into its inoperative position upon actuation of the hydraulic jack 9 in the direction of the arrow O (FIG. 3).

Turning to the valve illustrated in FIGS. 4 and 5, the bearings 4 for the arms 3 carrying the valve shutter 2 are machined across the rear ends of the corresponding pistons 15 the opposite ends of which are fitted inside cylinders 16 the axes of which are parallel with the axis of the valve channel 8. These cylinders 16 are formed integral with the valve body and the bottom of each of them communicates through a channel 17 with the outside of the valve body.

It will be readily understood that when the whole forced-flow system is set under still water conditions, the pressures ahead of and beyond the channel are equal and, consequently, it is an easy matter to make the valve shutter 2 pivot out of its open closing position into its position facing the seat 6, the pistons 15 being urged towards the rear ends of the cylinders 16 by the pressure of the water in the adjacent section 18 of the valve. If the pressure is now lowered in the downstream section 12 of the channel, the valve shutter 2 is urged against its seat by the pressure of the water in the upstream section of the channel, said pressure exerting on the valve shutter 2 a force directed downstream which is larger than that which is directed upstream on the pistons 15 the diameter of which is smaller. Said pistons consequently moves away from the rear ends of the cylinders 16.

When the pressures in the upper end lower sections of the channel are again restored to normal equilibrium, the pistons 15 are again urged back against the rear ends of the cylinders 16 by the pressure of the water inside the section 18 of the valve.

It should be noted that, in both above described embodiments of the valve, the valve shutter 2 is cap-shaped. This structure of the valve shutter is rendered possible by the fact that when the shutter has been closed and the pressure has been lowered in the downstream section of the channel, the hydraulic thrust on the shutter is balanced by the reaction of the seat 6, which reaction is uniformly distributed throughout the periphery of the valve shutter 2.

Figure 7:
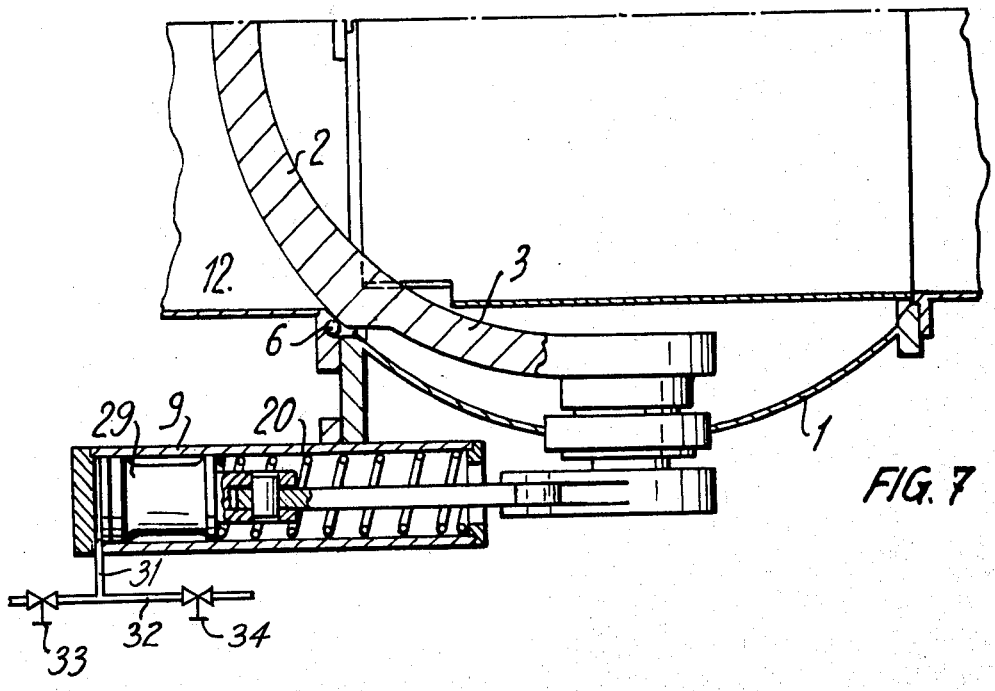
FIG. 7 is a partial longitudinal cross-section through line VII—VII of FIG. 6, the valve shutter being in its closed position.

The valve illustrated in FIGS. 6 to 9 includes a body 1 inside which is fitted a valve shutter 2 carried by the corresponding ends of the two arms 3, the opposite ends of which are pivotally carried by the journals or pivots 30 in the cooperating bearings 4 located in transverse registry with each other at diametrically opposite points in the valve body 1. These bearings 4 each comprise a cylindrical part forming an external clearance 19' between its periphery and the interior of inside a cylindrical housing 19, said housings being located at diametrically opposed points of the valve body 1 (FIG. 9).

Interconnection means in the form of the hydraulic jack 9 (FIG. 7) provides power for a pivotal movement of the valve shutter 2 between a valve closing position (FIG. 7) and a valve opening position (FIG. 6) while the channel system is under still water conditions.

For this purpose, the jack shifts, during a first stage, the journals 30 of the arms 3 carrying the valve shutter together with the corresponding bearings, within their housings 19 in the valve body so as to urge said parts upstream, whereby the shutter 2 is caused to move away from its seat 6 (FIG. 9). In view of the still water conditions it will be apparent that there is no downstream force being directed against the inside face of the shutter 2 and thus the shutter journals 30 and their attached bearings 4 initially will be displaced within the clearance 19' of the housing 19 in an upstream direction until the upstream exterior periphery of the journal bearings 4 engages the upstream internal periphery of the cylindrical housing 19. During a second stage, the jack 9 causes the shutter 2 to pivot in its bearings 4 to assume a valve open position.

When it is desired to make the shutter return from its open position (FIG. 6) into its intermediate position for movement into its valve closing position (FIG. 7), the channel being duly set under still water conditions as previously described, it is sufficient, to connect the hydraulic jack 9 with the exhaust pipe 31. The pipe 31 is connected with a branch pipe 32 communicating with a source of fluid under pressure through control valves 33, 34. The jack 9 is thus subjected to the action of its return spring 20, while the actual weight of the solid portion 21 of the shutter 2 urges the latter to fall by gravity into its intermediate position. The solid portion 21 thus amounts to a counterweight which is disposed downstream of the shutter journals 30 and thus at all times will tend to lower the shutter from its raised open position to its lowered closed position. During this latter stage, the bearings 4 carrying the pivots 30 of the arms 3 of the shutter 2 are still held in contact with the upstream sides of the walls of the housings 19 of the valve body 1 and it is only when the piston 29 of the jack 9 has reached the end of its stroke and the shutter has simultaneously pivoted to the closed position of FIG. 7 that the bearings 4 move gradually away from the upstream side of the housing walls 19. Simultaneously, the edge of the valve shutter 2 moves nearer the seat 6 and it is sufficient to reduce the pressure in the downstream section 12 of the channel 8 for the shutter to be urged against its seat 6 in valve closing position.

Numerous modifications of the embodiments disclosed hereinabove may be resorted to within the scope of the invention as defined by the accompanying claims.

Thus, the branch pipe 13 connected with the pipe 10 may be replaced by a pipe directly connecting the down-stream section of the channel with the upstream section of the valve body 1.

Instead of being controlled by a hydraulic jack, the valve shutter 2 may be driven by mechanical or manual means or by an electric motor.

The housings 19 (FIG. 9) wherein the bearings 14 are fitted with a clearance may be non-cylindrical in shape and comprise slideways along which the bearings 4 can move towards the upstream end of the valve body 1.

I claim:

1. A valve for a channel adapted to be set under still water conditions, comprising a valve body in said channel, a seat in said body facing upstream, a valve shutter in said valve body and pivotably shiftable around an axis perpendicular to the axis of the channel from an inoperative valve opening position into an intermediate position spaced from and facing said seat when the channel is set under still water conditions and subsequently displaceable from said intermediate position into a valve closing position in fluidtight contacting relationship with said seat by the pressure of the upstream water when the channel is no longer under still water conditions, cylindrical housings fixedly disposed relative said body, arms rigid with said valve shutter and each having a journal pivotally disposed within said housings to allow pivotal shifting of said shutter between said valve opening and intermediate positions, the exterior of said arm journals defining a clearance between said journals and the interior of said cylindrical housings, interconnection means joined between said valve body and said arm journals for radially displacing said journals within said clearances between a first position in which the pivotal movement of the shutter carrying journals can take place under still water conditions and a second position in which said journals together with said shutter carrying arms and the shutter are urged into a valve closing position with said shutter engaging said valve body seat, and said interconnection means operable to pivot said journals to displace said shutter from said valve closing position to said valve opening position.

2. A valve according to claim 1 wherein, said shutter when in the opening position is disposed within said body above said channel and includes counterweight means disposed in a vertical plane downstream of said arm journal to urge said shutter from said opening position to said intermediate position.

3. A valve for a channel adapted to be set under still water conditions, comprising a valve body in said channel, a seat in said body facing upstream, a valve shutter in said valve body and pivotably shiftable around an axis perpendicular to the axis of the channel from an inoperative valve opening position into an intermediate position spaced from and facing said seat when the channel is set under still water conditions and subsequently displaceable from said intermediate position into a valve closing position in fluidtight contacting relationship with said seat by the pressure of the upstream water when the channel is no longer under still water conditions, cylindrical housings fixedly disposed relative said body, arms rigid with said valve shutter and each having a journal pivotally disposed within said housings to allow pivotal shifting of said shutter between said valve opening and intermediate positions, the exterior of said arm journals defining a clearance between said journals and the interior of said cylindrical housings, inter-connection means joined between said valve body and said arm journals for radially displacing said journals within said clearances between a first position in which the pivotal movement of the shutter carrying journals can take place under still water conditions and a second position in which said journals together with said shutter carrying arms and the shutter are urged into a valve closing position with said shutter engaging said valve body seat, said interconnection means operable to pivot said journals to displace said shutter from said valve closing position to said valve opening position, said interconnection means including power means connected to said arm journals and operable to urge said journals radially in an upstream direction to first move said shutter from its closing position away from said seat and into its intermediate position and thereafter cause said shutter to pivot about said journals into said valve opening position, and said shutter including a weighted portion which urges it from its now open position into its intermediate position by gravity when said power means is placed in an inoperative condition.

4. A valve according to claim 3 wherein said power means comprises a fluid operated jack including a piston connected to said cam journals and, spring means normally urging said piston into an inoperative position.

* * * * *